J. ROUQUAUD.
STEAM OR HOT WATER CIRCULATING APPARATUS.
APPLICATION FILED APR. 26, 1909.
1,008,285.
Patented Nov. 7, 1911.
2 SHEETS—SHEET 1.
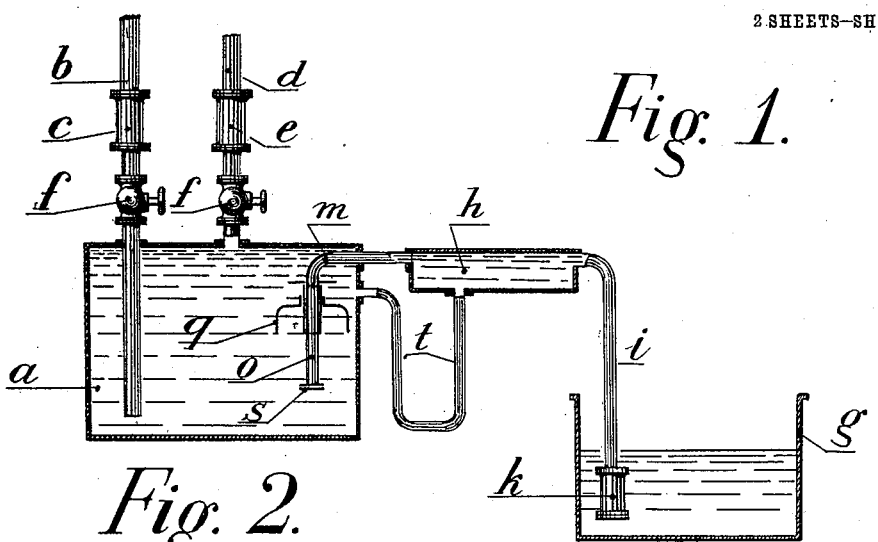
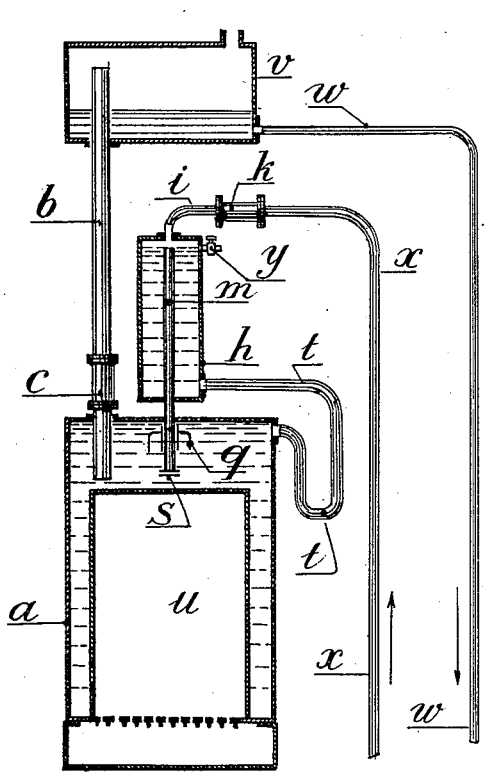
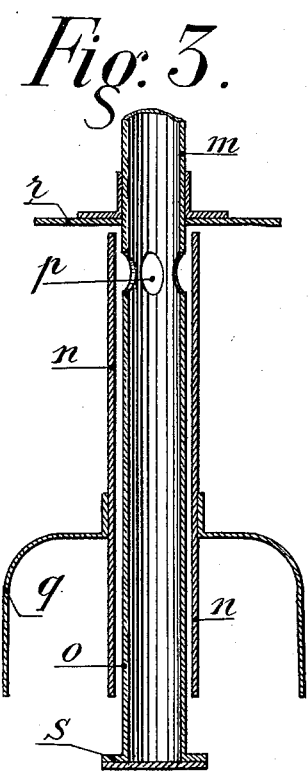

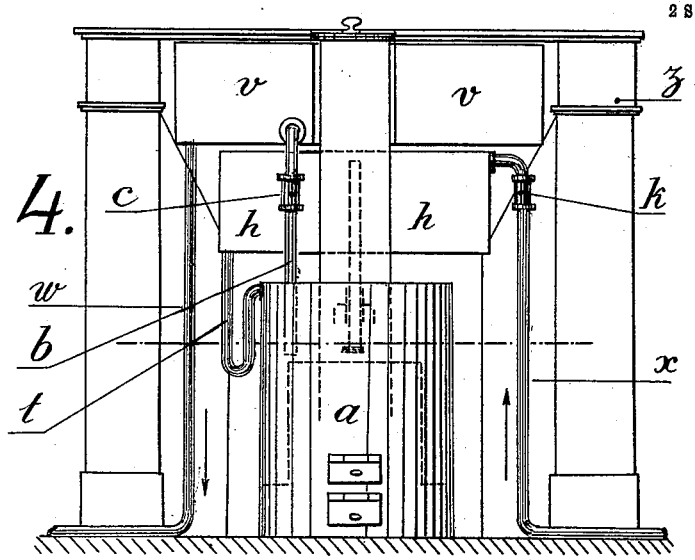
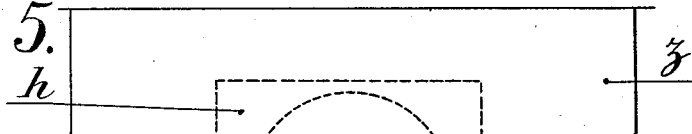
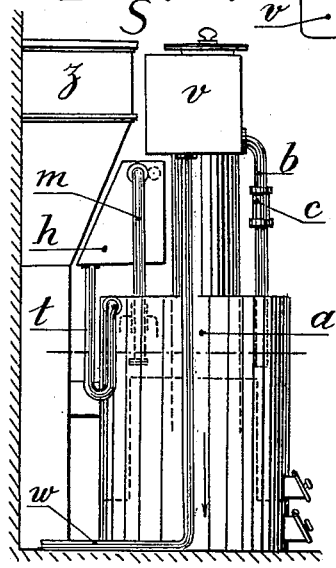

UNITED STATES PATENT OFFICE.

JEAN ROUQUAUD, OF PARIS, FRANCE.

STEAM OR HOT-WATER CIRCULATING APPARATUS.

1,008,285. Specification of Letters Patent. Patented Nov. 7, 1911.

Application filed April 26, 1909. Serial No. 492,308.

*To all whom it may concern:*

Be it known that I, JEAN ROUQUAUD, a citizen of the French Republic, and resident of Paris, France, have invented certain new and useful Improvements in Steam or Hot-Water Circulating Apparatus.

This invention relates to a steam or hot water circulating apparatus. With installations of known constructions which serve for the same purpose, it is necessary to arrange the apparatus in such a manner, that, in order to insure a proper working, the hot water is sent into an expansion tank which is placed above the apparatus proper, the reflow of the cooled water into the apparatus being nearly exclusively due to the difference of elevation which exists between said tank and the apparatus. With such installations, the steam generated is simply condensed in a suitable serpentine tube and the water of condensation is sent back into the circuit.

According to the present invention, the entire quantity of steam which is generated in the apparatus, if the plant serves for the circulation of hot water, or part of said steam if the plant serves for the circulation of steam, is suddenly condensed so that a depression is produced which is sufficient to insure the circulation by aspiration, which permits of placing the expansion tank even below the apparatus itself.

In the accompanying drawings, the invention is shown.

Figure 1 represents a diagram of a plant; Fig. 2 represents diagrammatically the apparatus for circulating hot water; Fig. 3 shows, on a larger scale, the manometrical float and the part of the tube upon which it is arranged; Figs. 4, 5 and 6 represent in front view, plan view and side view respectively a heating plant which is operated by the improved apparatus for circulating hot water.

The apparatus essentially consists of a boiler $a$ which is hermetically closed and which can be heated in any convenient manner; this reservoir is generally completely filled with water. According to whether the apparatus is destined for circulating hot water or steam, there is provided an outflow pipe $b$ passing into the reservoir and terminating at a short distance above the bottom of the boiler, or a steam pipe $d$ mounted upon the top plate of the boiler. Said pipes $b$ and $d$ are each closed by a non-return valve $c$ or $e$ respectively. In the drawings both pipes are provided; they have each a stop-cock $f$ so that the pipe which is not wanted can be shut off.

The feed water is contained in a water reservoir $g$ which is preferably situated below the boiler $a$ but which could be situated above the same as indicated by dotted lines $g^1$. Between said water-reservoir $g$ and the boiler $a$ an intermediate feed-tank $h$ is arranged which is connected with the water reservoir by the ascending pipe $i$ having at its lower end a non-return valve $k$, and with the boiler $a$ by means of an outflow pipe $m$ arranged at the top-part of the feed-tank and by means of a siphon-pipe $t$ which terminates with one end in the bottom plate of the feed tank and with its other end in the side wall of the boiler $a$. The vertical part $o$ of said outflow pipe $m$ which is closed at its end, has orifices $p$ above and below which abutments $r$ and $s$ are arranged destined to limit the movements of the float which is mounted on said pipe $o$ and consists of a tube $n$ (Fig. 3) adapted to slide upon said pipe and of a bell $q$ under which part of the steam generated in the boiler can collect. Said float rests normally upon the lower abutment $s$ so that the orifices $p$ are not closed and the boiler $a$ can freely communicate with the feed-tank $h$ by means of pipe $m$.

This apparatus operates as follows:—If the apparatus is destined for circulating hot water, the outflow pipe $d$ has to be closed and the boiler $a$, feed tank $h$ and pipes $m$, $t$, $i$ are completely filled with water; the float $n$ is in its lowest position, resting upon the abutment $s$. The boiler $a$ is heated and as long as the water in the same is not at boiling point the float $n$ will rest upon the lower abutment $s$, the boiler communicating with the closed intermediary tank $h$ by means of the pipes $m$ and $t$. The pressure in the boiler increases and the water is forced out through the outflow pipe $b$ and mounts above the non-return valve $c$. The pressure at the ends of the siphon pipe $t$ being equal to the pressure in the tank $h$ no circulation of water will take place and the water contained in the feed tank $h$ is only slightly heated. As soon however as the water of the boiler $a$ has reached the boiling point the float $n$ ascends owing to its buoyancy obtained by the collection of steam bubbles under the bell $q$ and closes the orifices $p$ of the tube $o$. From this moment the vaporization in the reservoir $a$ becomes very active and the water level in said boiler sinks rapidly owing to the expulsion of a large quantity of hot water through the outflow pipe $b$. The sinking of the water level in the boiler $a$ below the orifice of the siphon-pipe $t$ has no effect owing to the U-shaped form of said tube and the equilibrium is not disturbed until the water level has reached the lower end of the float which now sinks and uncovers the orifice $p$ whereby the following phenomena are produced:—
(a) Part of the steam will flow out from the boiler $a$ through the orifices $p$ and pipe $m$ into the feed-tank $h$ forcing out of said tank the water which thus flows suddenly through the siphon-pipe $t$ into the boiler $a$; (b) the water level in said reservoir consequently rises, the temperature of the water in the boiler decreasing simultaneously so that the generation of steam ceases and the float $n$, $q$ sinks upon the abutment $s$; (c) the steam which has flown into the feed-tank $h$ condenses in said tank and thereby produces a sucking-effect whereby a small quantity of cold water is drawn in from the water-reservoir $g$ through the pipe $i$; (d) this inflow of cold water into tank $h$ completes the condensation of all the steam contained in said tank and of the steam which still flows in through the orifices $p$; (e) in this manner there is produced in the tank $h$ and in the boiler $a$ a vacuum the degree of which depends on the steam pressure in the boiler and on the coldness of the water in the reservoir $g$. This vacuum sucks the water from the water reservoir $g$ into the boiler $a$, tank $h$ and pipes $m$, $t$ and $i$ which thus are again completely filled with water. The apparatus is again ready and the same cycle of operations begins again. In this manner the heated water is forced out through pipe $b$ at regular intervals, fresh cold water being automatically drawn in from the water reservoir $g$.

If instead of the outflow-pipe $b$ for hot water the steam pipe $d$ had been opened and the water pipe closed, the steam generated in the boiler $a$ would escape until the water level has sunk to the lower edge of the float $n$, $q$ when the apparatus will operate in the same manner as hereinbefore described.

This apparatus can be applied for a great many industrial and domestic purposes where a circulation of hot water or of steam is required and particularly for heating plants, washing tubs, with certain chemical industries and so forth.

Fig. 2 represents diagrammatically a plant for heating with hot water in which the apparatus according to the present invention is used. In this figure similar parts are designated by the same letters of reference as in Fig. 1. The furnace $u$ is arranged in the boiler $a$; the outflow-pipe $b$ terminates at its upper end in the expansion-tank $v$ from which the hot water is conducted by means of a canalization $w$ to the various radiators. The water returns from said radiators through the pipe $x$ to the non-return-valve $k$. The feed-tank $h$ is arranged vertically above the boiler $a$ and has at its upper end a blow-cock $y$, this cock is closed whereby a certain quantity of air is imprisoned in the apparatus and more precisely in the upper part of tank $h$ and in pipe $i$. This air-buffer serves to prevent the formation of a circulation between the water of tank $h$ and the water in the boiler $a$ as long as the float $n$, $q$ rests upon its seat $s$, that is to say, during the greatest part of the heating of the apparatus. The float is shown in Figs. 1 and 2 in the position which it assumes when the temperature in the boiler $a$ has just reached the limit where the operation of said float begins. The boiler $a$ is still filled with water and the float obturates the orifices $p$.

Figs. 4, 5 and 6 represent a heating plant according to the present invention, which does not require more space than that offered by an ordinary fire-place.

I claim:—

An improved steam or hot water circulating apparatus comprising in combination with the boiler, the outflow pipe communicating with the conduit for the hot water or steam, a reservoir for the feed water, an intermediate tank between said reservoir and the boiler, an ascending pipe connecting said intermediate tank with said reservoir, a non-return valve at the lower end of said ascending pipe, an outflow pipe at the upper end of said tank connecting the same with the boiler and a siphon-pipe terminating with one end in the bottom plate of said tank and with its other end in the side wall of the boiler, the vertical end of said outflow pipe located in the boiler and having orifices, an abutment above said orifices and an abutment below said orifices, a float consisting of a tube and of a bell movably mounted upon said vertical end of the outflow pipe between said two abutments, substantially as described and shown and for the purpose set forth.

In witness whereof I have hereunto set my hand in the presence of two witnesses.

JEAN ROUQUAUD.

Witnesses:
 DEAN B. MASON,
 ALFRED FREN.